United States Patent [19]

Andresen

[11] Patent Number: 5,600,768
[45] Date of Patent: Feb. 4, 1997

[54] IMAGE GENERATION WITH DYNAMICALLY CONSOLIDATED LIST OF IMAGE DATA

[75] Inventor: Kevin W. Andresen, Campbell, Calif.

[73] Assignee: Apple Computer, Inc., Cupertino, Calif.

[21] Appl. No.: 473,281

[22] Filed: Jun. 6, 1995

[51] Int. Cl.⁶ ............................................. G06F 15/00
[52] U.S. Cl. ............................................. 395/135
[58] Field of Search .................. 395/140, 141, 395/134, 135; 345/113, 114

[56] References Cited

U.S. PATENT DOCUMENTS 5,386,502  1/1995  Minagawa .......................... 395/141
5,448,688  9/1995  Hemingway ....................... 395/141
5,473,739  12/1995  Hsu ................................... 395/134

*Primary Examiner*—Phu Nguyen
*Attorney, Agent, or Firm*—Burns, Doane, Swecker & Mathis, L.L.P.

[57] ABSTRACT

In an image generating device, descriptions of objects which constitute an image are stored in an intermediate form in a display list. The data which describes the objects is stored in an plurality of lists, where each list is related to a region of the image. To create each list, objects that appear in a given region of the image which are of the same type and which have the same appearance state are collected in buffers. A collection of objects is stored as a single entry in the display list upon change of the appearance state. As a result, the amount of overhead required to store the identifications of the objects is reduced.

28 Claims, 2 Drawing Sheets

IMAGE GENERATION WITH DYNAMICALLY CONSOLIDATED LIST OF IMAGE DATA

FIELD OF THE INVENTION

The present invention is directed to graphic imaging systems, such as printers and display monitors, and more particularly to the manner in which image data is stored in such devices during the process of generating an image.

BACKGROUND OF THE INVENTION

In a computer-based imaging system, data which describes an image is generated in a host computer, for example by means of a desktop publishing program, and then forwarded to an image generating device where it is converted into a format that can be used by the device. In an exemplary system, the image data from the host computer might be in the format of a high-level page description language (PDL). One example of a well-known PDL is PostScript. In the host computer, graphic commands from the desktop publishing program, or other suitable application program, are converted into PDL commands. These commands are sent to the printer which interprets them and determines which types of graphics operations are to be performed, such as draw a rectangle or a particular character of text. The interpretation process typically also determines associated graphic state arguments that apply to each object, such as color, font, size, and the like. This information is then converted into pixel display values which are stored in a frame buffer to represent the shapes and colors of the objects. The values in the frame buffer are used to control the operation of the active elements in a print engine, such as a laser diode in a laser printer or a print head in an inkjet printer, to form the image. The process of converting the high-level PDL commands into the frame buffer display values is known as rendering.

To increase the overall rate at which printing is carried out, particularly for complex documents containing different types of objects, the various steps of the rendering process might be pipelined. At one or more stages of the process, the image data is converted to an intermediate form which can be utilized more efficiently by the next stage. For example, in one well-known type of operation relating to laser printers, high-level graphics operations are determined from the PDL data, and stored in a display list from which they are provided to the stage which generates the individual pixel display values.

Typically, one of two different types of organization is employed to store data pertaining to objects and graphic states in the display list. In one form of organization, the objects are sorted by time, i.e., they are stored in the order in which they were drawn by the user. In the other form, the objects are sorted by their position in the image, with reference to the direction of output device processing, e.g., the scanning of a laser beam across a photosensitive element in a laser printer. Sorting by time offers the advantage that it preserves imaging order. If a later-created object overlaps an earlier created object, it will obscure some or all of the earlier-created objects in the final image (assuming the objects are opaque). The time-sorted display list inherently identifies the overlapping relationship of the objects without the need to store additional information pertaining thereto. However, the list of objects can jump from one location on the page to another and back, which can result in certain inefficiencies in some types of rendering implementations. When the display list is sorted by position, more efficient rendering can be carried out. However, this approach requires additional information to be stored in the list which identifies the relative depth, i.e., front-to-back relationship, of objects in the image.

Even with time-sorted display lists, the amount of information to be stored is a significant consideration for purposes of efficient memory allocation. More particularly, each entry in the display list represents a shape or a graphics state command, e.g., color, to be applied to subsequent entries. In addition to this image data, each entry has some associated overhead information. This overhead information might comprise a header which describes the type of entry, and a pointer or other reference to the next entry on the list. In doubly-linked lists, another pointer refers back to the previous entry on the list.

It is desirable to store image data in a display list, or other intermediate form of data storage, in a manner which provides the benefits of both time-sorted entries and position-sorted entries, without the limitations associated with each. It is also desirable to minimize the overall amount of information that is stored in a display list, to provide more efficient memory utilization.

SUMMARY OF THE INVENTION

In accordance with the present invention, these objectives are achieved by storing display list data in an array of lists, rather than a single linked list of objects and graphic states. Each array is related to a nonoverlapping region of the image, such as a horizontal band. Within each array, the object information is generally sorted by time. The separation of the objects into the array provides a general sorting based on position, which leads to a more efficient rendering process. Within the arrays, the time based sorting retains the individual relationships among objects.

As a further feature of the invention, objects of the same type are collected and stored as a single entry in the display list. As a result, the amount of required overhead is reduced, since a header is not required for every object. For an image which contains a number of objects of the same type, the memory savings provided by this approach can be significant.

These features of the invention are preferably implemented with the use of a buffer or other form of temporary data storage. A buffer is established for each type of object which can be collected within each region of the image having an associated array. As objects are captured for the display list, they are accumulated in the respective buffers. Only one display list entry is required for each buffer. Upon receipt of the state command to change appearance, such as color, the contents of the buffers are stored in the display list, and the buffers are initialized to accumulate objects in the new color.

Further features of the invention, as well as the advantages attained thereby, are explained in detail hereinafter with reference to an exemplary embodiment illustrated in the accompanying drawings.

DETAILED DESCRIPTION

To facilitate an understanding of the present invention, it is described hereinafter with specific reference to its application to a display list for a printer. It will be appreciated, however, that the practical applications of the invention are not limited to this particular embodiment. Rather, the invention will find utility in any system in which image data is stored in an intermediate form for processing purposes, such as a display monitor, a graphics application program, or the like. Further in this regard, the invention is not limited to display lists, as that term is specifically understood in the context of printers. It can be applied to any intermediate form of image data that is stored for processing purposes.

Figure 1:
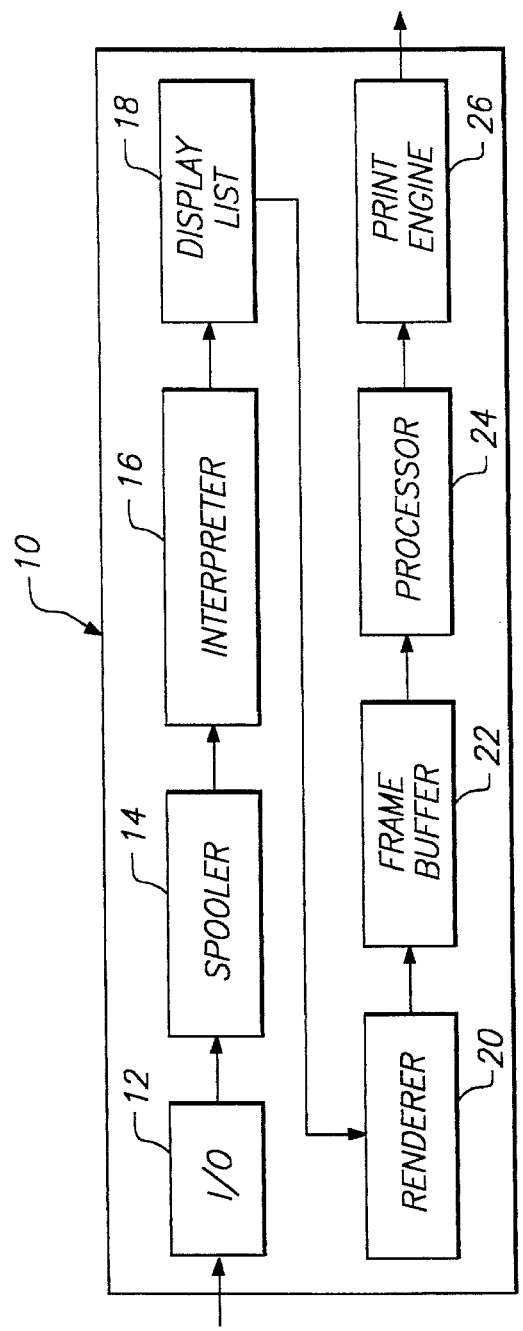
FIG. 1 is a general block diagram illustrating the major components of a printer, of a type in which the present invention can be employed.

FIG. 1 is a block diagram of the major components of a color printer of a type in which the present invention can be implemented. Referring thereto, the printer 10 includes an I/O controller 12 that is connected to one or more I/O ports for communication with computers and other external sources of data to be printed. A spooler 14 accumulates image data received from the external sources, and stores the data until it is ready to be processed for printing. It will be appreciated, of course, that the spooler is optional and can be incorporated in an external device, rather than the printer itself. An interpreter 16 receives a stream of image data and issues calls which cause the desired image to be drawn, or printed, on the paper. These calls can be of two basic types. One set of calls identifies the appearance state of objects to be drawn. This appearance state indicates the color of the object, as well as other appearance-related factors, such as patterns, transfer modes, e.g. transparency, and the like. The other set of calls describes the object to be drawn, such as a rectangle, a particular character of text, or the like. In the illustrated embodiment of the printer, these calls are stored in an intermediate data structure, known as a display list 18, or a metafile.

The information on the display list is provided to a renderer 20. The renderer converts the object-based information from the interpreter 16 into individual pixel display values, which are stored in a frame buffer 22. The pixel display values stored in the frame buffer can undergo optional processing within one or more processors 24. For example, the display values can be compressed and/or decompressed, or undergo halftone processing. Ultimately, these display values are supplied to a print engine 26, to control the actual printing of the desired image. The print engine could be of the laser beam printer type. Alternatively, the print engine could be of the ink jet type.

Figure 2:
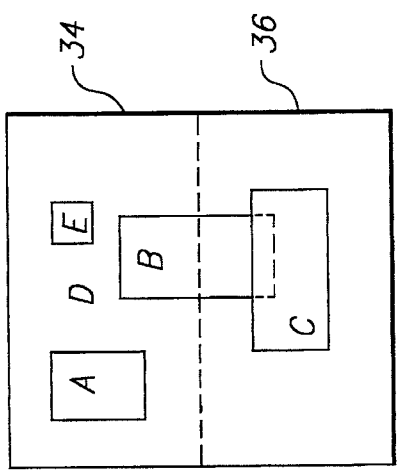
FIG. 2 is an illustration of an image which serves as example for explaining the features of the present invention.

An illustration of the type of data stored in the display list is given with reference to an exemplary image shown in FIG. 2. Referring thereto, the image consists of five objects, namely rectangles A, B, C and E, and a text character, or glyph, D. While rectangles are shown in this example for illustrative purposes, it will be appreciated that the individual objects could comprise any geometric shape, line, character of text, or the like. The objects are drawn by the user in the order indicated by their associated alphabetic designators, i.e., rectangle A was drawn first and rectangle E was drawn last. Since rectangles B and C partially overlap one another, and rectangle C was drawn later, it obscures a portion of rectangle B, as indicated by the dashed lines.

If all of the objects have the same color, such as black for example, a conventional time-sorted display list might contain the following information:

Set B lack
    Draw Rectangle A
    Draw Rectangle B
   &nbs. Draw Rectangle C
    Draw Glyph D
    Draw Rectangle E The description for each object includes an indication of its size and its position in the image. For a rectangle, these two items of information are defined by designating the top left (TL) corner and the bottom right (BR) corner of the rectangle. The rectangle represents a relatively simple object to draw. Other, more complex objects may have more state information stored in the display list. For example, a glyph may have an associated reference count which indicates how many times it appears in the image, or a relevant portion of the image.

Figure 3:
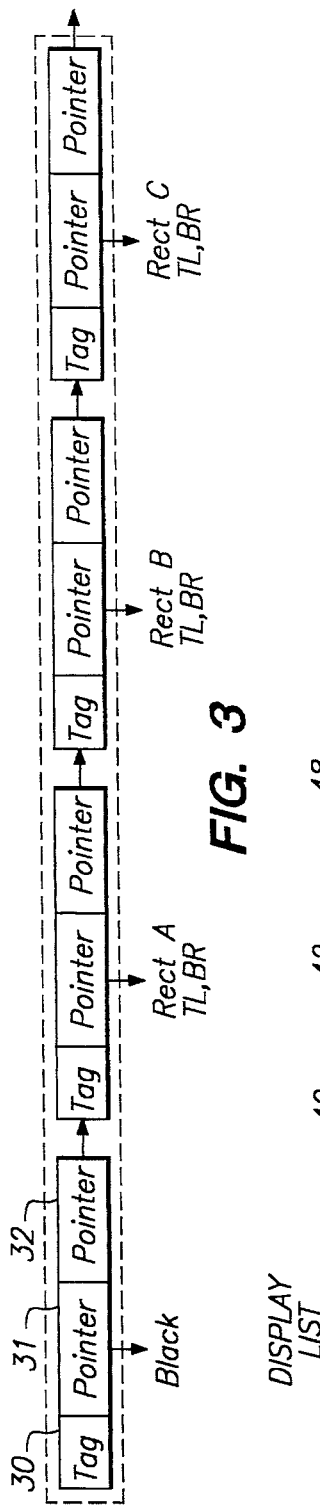
FIG. 3 is an illustration of one format for storing data in a display list.

If the image is comprised of multiple colors, additional graphic state commands are stored in the display list to identify the different appearance states for the objects. For example, if the object C is red, and all other objects are black, the display list data might appear as follows:

Set B lack
    Draw Rectangle A
    Draw Rectangle B
Set Red
    Draw Rectangle C
Set Black
    Draw Glyph D
    Draw Rectangle E Typically, the display list is stored as a linked list, where each entry includes a header that identifies the entry as well as the location of the next entry on the list. The need to store this information presents a certain amount of overhead that is associated with each entry, i.e., data that must be stored in memory but which does not contain any information about the image itself. An example of this overhead is shown in FIG. 3. Referring thereto, the header for each entry on the display list has three items of information stored with it. A first item 30 is a tag which describes the type of entry, i.e., whether it defines an object or a graphic state command. The second item 31 is a pointer to the description of the object or state command. The third item 32 is a pointer to the next entry on the list.

In accordance with the present invention, the data in the display list is formatted in a manner which provides for more efficient rendering and more efficient memory utilization. As a first feature of the invention, the page to be printed is divided into a number of non-overlapping regions, and the data is sorted according to region. In the example of FIG. 2, the page is divided into two regions which comprise horizontal bands 34 and 36. In practice, the page can be divided into any number of regions, which can have any shape. Preferably, the shape of the region is related to the manner in which the image generating device operates. Thus, for a laser printer, horizontal bands are preferable because they correspond to the path of the laser beam as it scans the photosensitive element.

In the display list, the image data is first sorted by the regions of the page. Within each region, the data is sorted in temporal order. Thus, for the example of FIG. 2, the display list might appear as follows:

Band 1: Set Black
  Draw Rectangle A
  Draw Rectangle B
  Draw Glyph D
  Draw Rectangle E
Band 2: Set Black
  Draw Rectangle B
  Draw Rectangle C By storing the data in this manner, the advantages of both positional sorting and temporal sorting are attained. More particularly, by storing the data according to region of the page, the data is sorted, at least at a general level, by position. As a result, more efficient rendering is possible. As the number of regions is increased, and hence each region becomes smaller, the positional-related efficiency increases. Within each region, the sorting of the data in temporal order preserves the individual relationships of the objects within the band, and thereby avoids the need to store additional information which describes these relationships.

In the foregoing example, the rectangle B is not wholly contained in a single band. Since it is present in two bands, a descriptor for the rectangle must be present in the information stored for each band. There are three possible approaches to handling this type of situation. In one approach, the rectangle B can be thought of as two adjoining rectangles which are respectively located in the two bands. In such a case, the descriptor of one of the rectangles, i.e., the upper half of rectangle B, can be contained in the display list entries for the first band, and the descriptor for the other rectangle, which comprises the lower half of Rectangle B, can be contained in the display list entries for the second band. In a second approach, a complete descriptor of the rectangle B can be included in the display list entries for each of the two bands. In other words, the description of rectangle B in the display list entry for the first band includes data that pertains to the second band, and vice versa. During the rendering process, however, any data pertaining to a portion of an object that is outside a band of interest is not rendered. Rather, rendering only takes place with respect to the area of intersection between the object identified on the display list and the area of the band.

In a third approach to storing display list entries for objects which cross the border of a band, a complete descriptor of the object is present in the display list entries for the first band in which the object appears. In the present example, the display list entry for Band 1 contains a complete description of the rectangle B. For all other bands in which the object is present, the display list comprises a pointer, or analogous form of reference, to the description in the first band in which the object appears. Since a pointer typically comprises a smaller amount of information than a complete description of an object, the use of the pointer to refer back to an earlier description of the object results in an overall savings of memory required for the display list.

As a further feature of the invention, the overhead required to store image information in the display list is reduced by grouping related objects in a single entry. This feature is based upon the observation that a typical image is comprised of a number of similar objects. For example, a page of text is made up of various characters, or glyphs, which appear several times on the page. If all of the characters of a given type can be stored as an aggregate in a single display list entry, less overhead is required to store them. In addition, they can be processed more efficiently, since fewer entries require fewer procedure calls to retrieve and handle the entries. Despite the fact that the temporal relationship of objects may be lost when they are grouped by type, in an opaque imaging model the order in which objects are rendered is irrelevant if they are all of the same color. Thus, objects are grouped according to color, as well as type.

Figure 4:
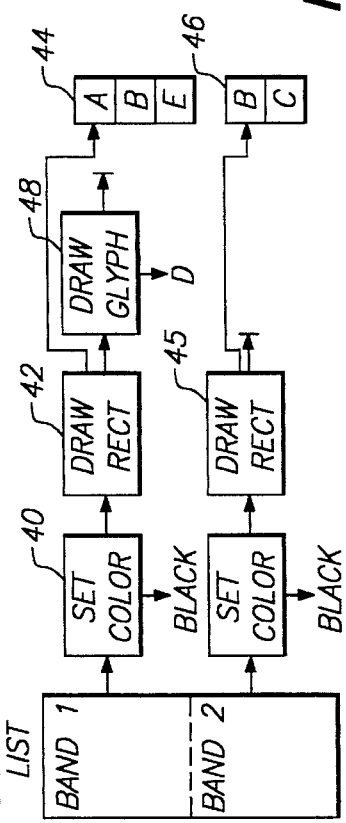
FIG. 4 is an illustration of a first example for storing data in a display list in accordance with the present invention.

In the implementation of the invention, temporary data stores, e.g. buffers or caches, are set up for groups of related objects. Separate sets of buffers are established for each band of the page. Within each band, a buffer is initialized for each type of object which can be grouped. FIG. 4 illustrates one manner in which the buffers can be organized. When the first call for a band is generated by the interpreter, an entry is stored in the display list which points to that call. Thus, in the example of FIG. 4, the display list entry points to the call 40 to set the color to black. The next call is to draw the rectangle A. In response thereto, the next entry pointer for the display list entry 40 points to the call 42 to draw a rectangle. This display list entry points to a buffer 44 which contains the description of the rectangle A.

The next object received from the interpreter 16 is the rectangle B. When a call to draw a new object is issued, a determination is made whether a descriptor for that type of object is already present in one of the buffers for the band in which the object appears. In the case of rectangle B, a descriptor for that type of object already exists in the Band 1 buffers, for rectangle A. In such a case, rather than creating a new display list entry, the definition of the rectangle B is appended to the information contained in the existing buffer for this type of object. Thus, the definition of the rectangle B follows that for the rectangle A in the buffer 44.

In addition, an entry 45 is created in the display list for the second band in which the rectangle B also appears, and it points to a second buffer 46 associated with the second band. If the page contains additional bands (not shown in the drawings), and the rectangle B is present in these additional bands, a buffer in each band would contain a descriptor for the rectangle B.

Subsequently, a call is issued by the interpreter to draw the rectangle C. This object resides in the second band, and its description is added to the buffer 46 for that band, which has already been established for rectangle objects.

The call to draw the glyph D represents a new type of object. Therefore, the last entry 42 in the display list for the first band is updated to point to this new call 48.

Finally, a call to draw the rectangle E is issued. As with rectangle B, since a buffer has already been established for this type of object, it is appended to the objects stored in the buffer 44.

This procedure continues until one of two events occurs. If the end of the page is reached, all of the contents of the various buffers are transferred from the buffers to the memory allocated to the display list, and the pointers are updated as appropriate. At this point, the display list has been completed for the page. Unlike a conventional display list, it does not contain a header for every object on the page. Rather, by grouping similar objects within bands as a single entry, the amount of overhead required to store the definitions of the objects is reduced.

The other condition which causes an interruption to the accumulation of data in the buffers is a call which causes the graphic state to change, e.g., a change in color. This action is carried out to preserve temporal information which is important to the final image. More particularly, the grouping of objects by type results in a rearrangement of their order within the display list. For instance, in the example described above, the rectangle E will appear on the display list before the glyph D, and therefore will be rendered first. As long as any two objects have the same color, their relative order of rendering is not significant. For example, if the rectangle E and the glyph D where to overlap, it is irrelevant which one is drawn first if they have the same color, since the area of their intersection will still end up being that color. If, however, two overlapping objects have different colors, the order in which they are rendered becomes important, since the color of the later-rendered object will dominate the area of their intersection.

For this reason, whenever a state call is issued which causes a change in appearance, the accumulation of object descriptors is interrupted, and the contents of the buffers are transferred to the display list, as in the case of the end of the page described above. After this occurs, all the buffers are re-initialized and the accumulation of objects in the buffers takes place for the new color.

Figure 5:
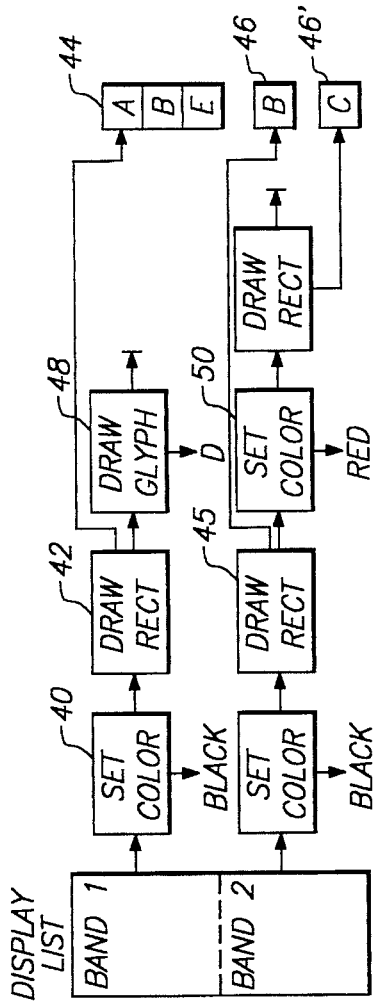
FIG. 5 is an illustration of a second example for storing data in a display list in accordance with the present invention.

This case is illustrated in the example of FIG. 5. In this example, the procedure is the same as that described in connection with FIG. 4 for the calls to draw the rectangles A and B. After these calls, a state call to set the color to red, for the rectangle C, is issued. This call 50 is stored as an entry in the display list for the second band. At this point, the contents of the buffers for the second band, in this case the description of the rectangle B in the buffer 46, are transferred to the display list. Thereafter, the buffers for the band are used to accumulate objects in the new color. Thus, the definition of the rectangle C can be stored in the buffer which has just been flushed, as depicted at 46'.

After the call for the rectangle C, the calls to draw the black objects D and E are issued. Since the call 50 to set the color red did not affect the first band, its buffers contents were not transferred to the display list. As a result, the description of the rectangle E is appended to the contents of the buffer 44, which has remained intact. Thus, as long as the appearance state for a band stays the same, objects of the same type can continue to be accumulated in a single display list entry.

From the foregoing, it can be seen that the present invention facilitates the rendering process by ordering data in a display list in accordance with regions of the image to be generated. Such ordering of the data results in a general sorting according to position, which provides for a more efficient rendering. Within each region, the data is sorted in time order, with one exception. The number of display list entries is reduced by dynamically consolidating multiple objects of the same type into a single aggregate entry, thereby reducing the amount of memory consumed by the display list.

It will be appreciated by those of ordinary skill in the art that the present invention can be embodied in other forms without departing from the spirit or essential characteristics thereof. The presently disclosed embodiments are therefore considered in all respects to be illustrative and not restrictive. The scope of the invention is indicated by the appended claims, rather than the foregoing description, and all changes that come within the meaning and range of equivalents thereof are intended to be embraced therein.

What is claimed is:

1. In a graphic imaging system, a method for storing data which describes an image in an intermediate form during processing of said data to generate the image, comprising the steps of:

generating commands which describe objects in said image and appearance states for said objects;

creating an intermediate data structure containing entries which correspond to said commands;

accumulating commands which pertain to a given type of object; and storing the accumulated commands pertaining to the given type of object as a single entry in said data structure.

2. The method of claim 1 wherein said accumulated commands all pertain to objects having the same appearance state in the image.

3. The method of claim 2 wherein said appearance state is the color of the objects in the image.

4. The method of claim 1 further including the steps of dividing the image into a plurality of non-overlapping regions, and sorting the entries in said data structure according to said regions.

5. The method of claim 4 further including the step of storing the entries in said data structure which correspond to a given region in the order in which they are generated.

6. The method of claim 4 wherein said accumulating step comprises the steps of:

establishing temporary storage locations for each of said regions and for each type of object within each region;

examining said commands as they are generated;

determining whether a command is the first one to describe a given type of object within a given region;

associating one of the storage locations for the given region with said given type of object and storing said command in said storage location if the command is the first one to describe the given type of object in that region; and appending a command to commands stored in a storage location that has been previously associated with the given type of object if said command is not the first one to describe the given type of object in a region.

7. The method of claim 6 further including the step of storing an entry in said data structure which refers to a storage location when the storage location is associated with an object type.

8. The method of claim 6 further including the steps of detecting a command which calls for a change in the appearance state of objects, and transferring commands sorted in said storage locations to said data structure upon detection of such a command.

9. In an image generating device, a method for storing data which describes an image in an intermediate form during processing of said data to generate the image, comprising the steps of:

dividing an image into a plurality of non-overlapping regions;

generating commands which describe objects in said image and appearance states for said objects;

storing said commands in a plurality of lists wherein each list is associated with one of said regions and the entries in a list pertain to objects within the associated region of the image; and storing the commands within a list in the order in which they are generated.

10. The method of claim 9 wherein said regions comprise parallel bands which extend from one side of the image to the other.

11. The method of claim 9 wherein the step of storing the commands in the plurality of lists comprises the steps of establishing a temporary storage location for each region, detecting the region to which a command pertains as it is generated and storing the command in the storage location associated with the detected region, and creating an entry in the list which is associated with the detected region that refers to said storage location.

12. The method of claim 11 further including the step of transferring the commands stored in the temporary storage locations to the associated lists upon the detection of a predetermined command.

13. The method of claim 12 wherein said predetermined command is one which indicates the end of the image.

14. The method of claim 12 wherein said predetermined command is one which indicates a change of color for objects in the image.

15. In an image generating device, a method for storing data which describes an image in an intermediate form during processing of said data to generate the image, comprising the steps of:

dividing an image into a plurality of non-overlapping regions;

generating commands which describe objects in said image;

establishing temporary storage locations for each of said regions and for different types of objects within each region;

examining said commands as they are generated;

determining whether a command is the first one to describe a given type of object within a given region;

associating one of the storage locations for the given region with said given type of object and storing said command in said storage location if the command is the first one to describe the given type of object in that region; and appending a command to commands stored in a storage location that has been previously associated with the given type of object if said command is not the first one to describe the given type of object in a region.

16. The method of claim 15 further including the step of storing an entry in a data structure which refers to a storage location when the storage location is associated with an object type.

17. The method of claim 15 further including the steps of detecting a command which calls for a change in the appearance state of objects, and transferring commands sorted in said storage locations to said data structure upon detection of such a command.

18. A device for storing data pertaining to an image to be generated, comprising:

means for generating commands which describe objects in an image;

a memory for storing a list of said commands;

means defining a plurality of non-overlapping regions of said image;

a plurality of temporary storage locations each of which is associated with one of said regions;

means for determining which region of the image each command pertains to and for storing the command in a storage location associated with that region; and means for transferring the commands stored in said storage locations to said list upon detecting the generation of a predetermined command.

19. The device of claim 18 wherein said predetermined command is one which indicates a change in the color of objects in said image.

20. The device of claim 18 wherein a plurality of storage locations are associated with at least one of said regions, and each of said plurality of storage locations associated with a region respectively corresponds to a different type of object.

21. The device of claim 20 wherein said determining means determines the type of object to which a command pertains and stores the command in the storage location that corresponds to the determined type of object, such that all objects of the same type which pertain to a given region of the image are stored in the same storage location.

22. A device for storing data pertaining to an image to be generated, comprising:

means for generating commands which describe different types of objects in an image;

a memory for storing a list of said commands;

a plurality of storage locations each of which corresponds to one of said types of objects;

means for determining the particular type of object to which a command pertains and for storing the command in the storage location that corresponds to the determined type, such that all commands which pertain to a given type of object are stored in the same storage location; and means for transferring the contents of each of said storage locations to said list upon detection of a predetermined command, wherein the contents of a storage location is stored in said list as a single entry.

23. The device of claim 22 wherein said predetermined command is one which indicates a change in the color of objects in said image.

24. The device of claim 22 wherein each entry in said list includes a header which identifies the entry and which refers to the next entry on the list.

25. In a graphic imaging system, a method for generating an image, comprising the steps of:

generating object-based commands which describe objects in an image and appearance states for said objects;

creating an intermediate data structure containing entries which correspond to said commands;

accumulating commands which pertain to a given type of object;

storing the accumulated commands pertaining to the given type of object as a single entry in said data structure;

retrieving the entries from the data structure;

converting the object-based commands into individual pixel display values;

providing the individual pixel display values to an image generating engine; and generating the image in a tangible medium via said image generating engine, in accordance with said pixel display values.

26. A method for generating an image, comprising the steps of:

dividing an image into a plurality non-overlapping regions;

generating object-based commands which describe objects in said image and appearance states for said objects;

storing said commands in an array of lists wherein each list is associated with one of said regions and the entries in a list pertain to objects within the associated region of the image;

storing the commands within a list in the order in which they are generated;

retrieving the commands from said lists; converting the object-based commands into individual pixel display values; and providing the individual pixel display values to an image generating device to thereby generate the image.

27. A device for generating an image comprising:

means for generating object-based commands which describe objects in an image;

a memory for storing a list of said commands;

means defining a plurality of non-overlapping regions of said image;

a plurality of temporary storage locations each of which is associated with one of said regions;

means for determining which region of the image each command pertains to, and for storing the command in a storage location associated with that region;

means for transferring the commands stored in said storage locations to said list upon detecting the generation of a predetermined command;

means for retrieving the object-based commands stored in said list and converting them into individual pixel display values; and an imaging engine for generating a visible image corresponding to said individual pixel display values.

28. A device for generating an image, comprising:

means for generating object-based commands which describe different types of objects in an image;

a memory for storing a list of said commands;

a plurality of storage locations each of which corresponds to one of said types of objects;

means for determining the particular type of object to which a command pertains and for storing the command in the storage location that corresponds to the determined type, such that all commands which pertain to a given type of object are stored in the same storage location;

means for transferring the contents of each of said storage locations to said list upon detection of a predetermined command, wherein the contents of a storage location is stored in said list as a single entry;

means for retrieving the object-based commands stored in said list and converting them into individual pixel display values; and an imaging engine for generating a visible image corresponding to said individual pixel display values.

* * * * *